F. G. Butler,
Evaporator.
No. 112,319.          Patented Mar. 7, 1871.
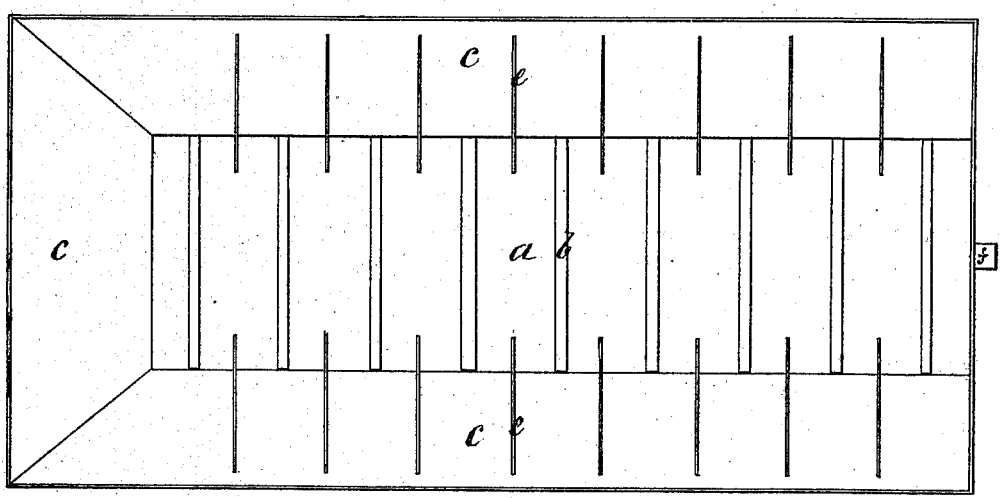
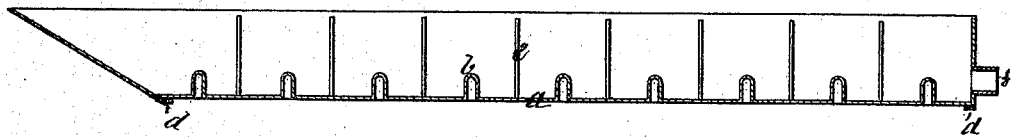

UNITED STATES PATENT OFFICE.

FRANCIS G. BUTLER, OF BELLOWS FALLS, VERMONT, ASSIGNOR TO HIMSELF AND JAMES B. WILLIAMS, OF GLASTONBURY, CONNECTICUT.

IMPROVEMENT IN EVAPORATING-PANS FOR SACCHARINE LIQUIDS.

Specification forming part of Letters Patent No. 112,319, dated March 7, 1871.

*To all whom it may concern:*

Be it known that I, FRANCIS G. BUTLER, of Bellows Falls, county of Windham and State of Vermont, have invented certain new and useful Improvements in Evaporating-Pans; and to enable others skilled in the art to make and use the same, I will proceed to describe it, referring to the drawings, in which the same letters indicate like parts in each of the figures.

The nature of this invention consists in forming a corrugated pan-bottom. The width of the sheets which form the bottom also forms the length of said corrugations. Its sides are made broad and flaring at an angle of about forty-five degrees. On each side and about half-way between each corrugation are arranged scum-arresters, fitted to the bottom and sides of the pan and extending onto the pan-bottom about one-fourth of its width, the upper edges extending thence in a straight line to nearly the top edge of the flaring sides, the object of which is to arrest and hold the scum upon the flaring sides, thus affording facility for gathering and removing the scum.

In the acccompanying drawings, Figure 1 is a top or plan view of this pan. Fig. 2 is a side section view.

$a$ is the bottom of the pan.

$b$ are the corrugations, of the same length as the width of the bottom $a$. These corrugations are formed in the common way.

$c$ are flaring sides, formed at an angle of about forty-five degrees with the bottom, and having a lip or flange, $d$, which laps onto and is secured to the under side of the bottom $a$.

$e$ are scum-arresters arranged between a part or all of the corrugations. The lower edges extend onto the bottom about one-fourth of its width, and are fitted and secured to the flaring sides, and extending nearly to the top or outer edge thereof, thus forming elevated compartments upon the sides for arresting and holding the scums until removed.

$f$ is a discharge-nozzle.

The scum-arresters also serve an important purpose in bracing and holding the sides and bottom firmly in their proper relative positions, preventing either from sagging out of shape, and in stiffening the whole structure of the pan, which is a highly important object to be attained with large pans constructed wholly of sheet metal, and they should be firmly secured to both sides and bottom.

During the process of evaporation the scums are thrown upon the sides by the ebullition of the fluid, and into the elevated compartments formed upon the sides by the scum-arresters, to be removed at the pleasure of the operator.

What I claim, and desire to secure by Letters Patent, is—

An evaporating-pan having corrugations running across the whole width of the bottom, in combination with a system of scum-arresters forming elevated compartments upon the flaring sides, substantially as and for the purpose set forth.

FRANCIS G. BUTLER.

Witnesses:
   EDM. F. BROWN,
   JEREMY W. BLISS.